(12) United States Patent
Gassmann

(10) Patent No.: US 11,480,248 B2
(45) Date of Patent: Oct. 25, 2022

(54) ACTUATOR AND LUBRICANT SUPPLY FOR A MOTOR VEHICLE

(71) Applicant: GKN Automotive Ltd., Birmingham (GB)

(72) Inventor: Theodor Gassmann, Siegburg (DE)

(73) Assignee: GKN Automotive Ltd., Birmingham (GB)

( * ) Notice: Subject to any disclaimer, the term of this patent is extended or adjusted under 35 U.S.C. 154(b) by 120 days.

(21) Appl. No.: 17/042,272

(22) PCT Filed: May 15, 2018

(86) PCT No.: PCT/EP2018/062530
§ 371 (c)(1),
(2) Date: Sep. 28, 2020

(87) PCT Pub. No.: WO2019/219174
PCT Pub. Date: Nov. 21, 2019

(65) Prior Publication Data
US 2021/0010586 A1    Jan. 14, 2021

(51) Int. Cl.
*F16H 63/30*   (2006.01)
*F15B 15/26*   (2006.01)
(Continued)

(52) U.S. Cl.
CPC ....... *F16H 63/3023* (2013.01); *F15B 15/261* (2013.01); *F16H 57/0435* (2013.01);
(Continued)

(58) Field of Classification Search
CPC ....... F16H 63/3023; F16H 61/30; F15B 15/26
See application file for complete search history.

(56) References Cited

U.S. PATENT DOCUMENTS

| 4,784,037 A | 11/1988 | Fabyan et al. |
| 4,843,951 A | 7/1989 | Bruggen et al. |

(Continued)

FOREIGN PATENT DOCUMENTS

| CN | 101960183 A | 1/2011 |
| DE | 873209 C | 4/1953 |
| DE | 202015102487 U1 | 8/2016 |
| JP | S57-167506 A | 10/1982 |

(Continued)

OTHER PUBLICATIONS

JPO Office Action dated Jan. 4, 2022 for related application JP2020-564176 (22 pages; with English machine translation).
(Continued)

*Primary Examiner* — Thomas E Lazo
(74) *Attorney, Agent, or Firm* — Bejin Bieneman PLC

(57) ABSTRACT

A hydraulic actuator can be provided for actuating a functional part by a movement of a force transmission element, with a working piston which can be acted upon by a hydraulic pressure of a pressure supply and is movable thereover between a first extreme position and a second extreme position in a piston/cylinder unit, wherein two chambers separated from one another by the working piston are present and a first chamber is formed as a first working chamber with a pressure inlet and a hydraulic pressure applied to the first pressure inlet urges the working piston in the direction of the first extreme position in order to enlarge the first working chamber.

At least one retaining means is provided which is capable of automatically locking the working piston in one of the extreme positions when this extreme position is reached, even without any hydraulic pressure being applied.

14 Claims, 3 Drawing Sheets

(51) Int. Cl.
*F16H 57/04* (2010.01)
*F16H 61/00* (2006.01)

(52) U.S. Cl.
CPC ..... *F16H 57/0446* (2013.01); *F16H 61/0021* (2013.01); *F16H 2061/0037* (2013.01)

(56) References Cited

U.S. PATENT DOCUMENTS

| | | | | |
|---|---|---|---|---|
| 5,092,187 | A | * | 3/1992 | Irwin ................. F16H 63/44 |
| | | | | 74/335 |
| 5,445,042 | A | | 8/1995 | Deady |
| 7,451,688 | B2 | * | 11/2008 | Takahashi ............ F15B 15/261 |
| | | | | 92/17 |

FOREIGN PATENT DOCUMENTS

| | | |
|---|---|---|
| JP | S63-093039 A | 6/1988 |
| JP | S63-502296 A | 9/1988 |
| JP | 2012-135840 A | 7/2012 |
| JP | 2017-506724 A | 3/2017 |
| WO | 2007039084 A1 | 4/2007 |
| WO | 2016042170 A1 | 3/2016 |
| WO | 2018014976 A1 | 1/2018 |

OTHER PUBLICATIONS

International Search Report and Written Opinion for PCT/EP2018/062530 dated Jan. 15, 2019 (14 pages; with English translation).
Chinese Office Action dated Jul. 5, 2021 for Application No. 201880093384.2 (21 pages; with English machine translation).

* cited by examiner

ACTUATOR AND LUBRICANT SUPPLY FOR A MOTOR VEHICLE

CROSS-REFERENCE TO RELATED APPLICATIONS

This application is a national stage of, and claims priority to, Patent Cooperation Treaty Application No. PCT/EP2018/062530, filed on May 15, 2018, which application is hereby incorporated herein by reference in its entirety.

BACKGROUND

A hydraulic actuator and an accompanying actuating system or lubricant supply system are known from WO 2018 014 976 A1. A similar system is described in WO 2016 042170 A1. These well-known actuators comprise a working piston reciprocating in a pressure cylinder, driven by the hydraulic pressure of a hydraulic pump. The piston rod of this working piston in turn is connected via a power transmission element, for example to the shift fork of a gearbox.

SUMMARY

To drive the working piston in an actuating or lubricant supply system, pressure inlets are provided on both sides of the working piston, via which hydraulic pressure can be applied alternately to the chambers in front or behind the working piston. An outlet for hydraulic fluid is provided in the central area of the pressure cylinder in order to supply hydraulic fluid used as lubricant or coolant to another component of the motor vehicle, in particular a drive train component. The hydraulic actuators of this type are thus used for the mechanical operation of a functional part of the motor vehicle, which requires a comparatively high hydraulic pressure.

On the other hand, the hydraulic actuators are also used as a lubricant or coolant feed pump for the hydraulic fluid then used as lubricating or cooling fluid. For this purpose, a hydraulic fluid outlet is provided in the side wall of the pressure cylinder, e.g., in the central area. The hydraulic fluid outlet is positioned with the pressure inlet via which the hydraulic fluid is fed into the pressure cylinder, so that the hydraulic fluid can then flow through the pressure cylinder.

The working cylinder of the actuator is reciprocally movable within the pressure cylinder between a first extreme position and a second extreme position. The pressure cylinder has two chambers separated by the working piston, whereby one or both chambers can serve as working chambers. In the latter case, the pressure cylinder has two pressure inlets so that both working chambers can be selectively pressurized with working pressure. This is done by means of a suitable control system, e.g., a control unit, which can of course be formed by the general vehicle control system. In an example, the control unit controls an electrically actuated valve and a pump providing the working pressure, which then serves as pressure supply.

The actuators as disclosed herein have the advantage that they can provide with one assembly both the higher working pressure for actuating the functional part, for example for shifting the transmission, and the coolant and/or lubricant supply.

A disadvantage of known actuators is that the system requires a continuous movement of the working piston to maintain the cooling and/or lubricating function. The reason for this is that, in continuous operation, the flow connection between the pressure inlet and the hydraulic fluid outlet is always established periodically. However, when the working piston comes to a complete stop, there is no guarantee that the desired flow connection is available.

Disclosed herein is a hydraulic actuator in which a defined position of the working piston is ensured with the simplest possible means but with the greatest possible safety. The actuator is provided to maintain the cooling and/or lubricating functions with increased safety, even if the working piston is not moved. Further, the hydraulic actuating and lubrication supply system which has high operational safety.

As disclosed herein, an at least unidirectionally stable working piston is used. In order to form this unidirectionally acting stability, the working piston is automatically tightened in one of the two extreme positions when approaching one of these two extreme positions by a correspondingly designed retaining means provided on the holding device, preferably in the pressure cylinder. Until a sufficient release force is applied, the working piston is then held in the extreme position by the holding force of the retention medium, so that the working piston is fixed in the defined position even without hydraulic pressure being applied.

In order to ensure that when using the actuator in an actuation and lubricant supply system, the pressure inlet, via which hydraulic fluid can be fed through the pressure cylinder into the hydraulic fluid outlet, is in flow connection with the hydraulic fluid outlet, additional means can be provided to ensure that the working piston actually reaches the area of attraction of the holding medium so that it can perform its function. In the simplest case, this is a resetting means which returns the working piston to the defined holding position when hydraulic pressure ceases or when the hydraulic pressure is reduced. Such a resetting means can be, for example, a spring means provided in the pressure cylinder. An example of this spring means is a coil spring wound around the piston rod of the working piston.

In the most basic case, there is a defined rest position for the working piston, which is forced into this rest position by the resetting means when the hydraulic pressure is removed or reduced. If the actuator is also used as a coolant and/or lubricant passage, a flow connection is then established between the pressure inlet and the hydraulic fluid outlet. This means that the hydraulic fluid provided by the pressure supply is pumped through the pressure cylinder. This is a preferred function of the combined actuator, but the unstable configuration of the actuator can also be used independently of this additional cooling and/or lubrication function.

Another alternative of the invention features a bistable working piston. In this case, two opposing holding means are provided, which perform the function described above at one of the extreme positions of the working piston. In connection with the cooling and/or lubricating function, a pressure inlet can then be provided on each side of the working piston within the pressure cylinder, which is charged with hydraulic pressure via a valve system alternating with the other pressure inlet to operate the actuator. The hydraulic fluid outlet can then, for example, be provided in the middle of the pressure cylinder so that, with the exception of the center position of the working piston, a flow connection is established with one of the two pressure inlets. The size of the working piston or a suitable valve system can be used to ensure that sufficient working pressure is available for the actuation function and that this pressure cannot escape via the hydraulic fluid outlet.

The holding device exerts an attraction and/or retention force on the working piston. If a spring means is provided as resetting means, the retaining means can be a detent connection only. The spring means can also simultaneously form the retaining means if, for example, the working piston is forced into the two extreme positions by a bistable diaphragm spring and the diaphragm spring is deformed in a reversing manner during the movement of the working piston. Permanent magnets or electromagnets are another possibility to form the holding device. These are arranged to push or pull the working piston into an extreme position. This can be done by external magnetic means or magnets integrated into the pressure cylinder. To operate the actuator, the hydraulic pressure then overcomes the magnetic holding force. In the case of an electromagnet, the mobility of the working piston can of course also be achieved by switching off the electromagnet.

In principle, however, use in an equivalent application with a pneumatic system is possible. In this case, instead of the hydraulic fluid outlet, a compressed air outlet would be used, through which compressed air fed into the pressure cylinder can be tapped.

SUMMARY OF THE DRAWINGS

Further details and advantages are described in the following description of preferred embodiments in the drawings.

In the drawings.

DESCRIPTION

Figure 1:
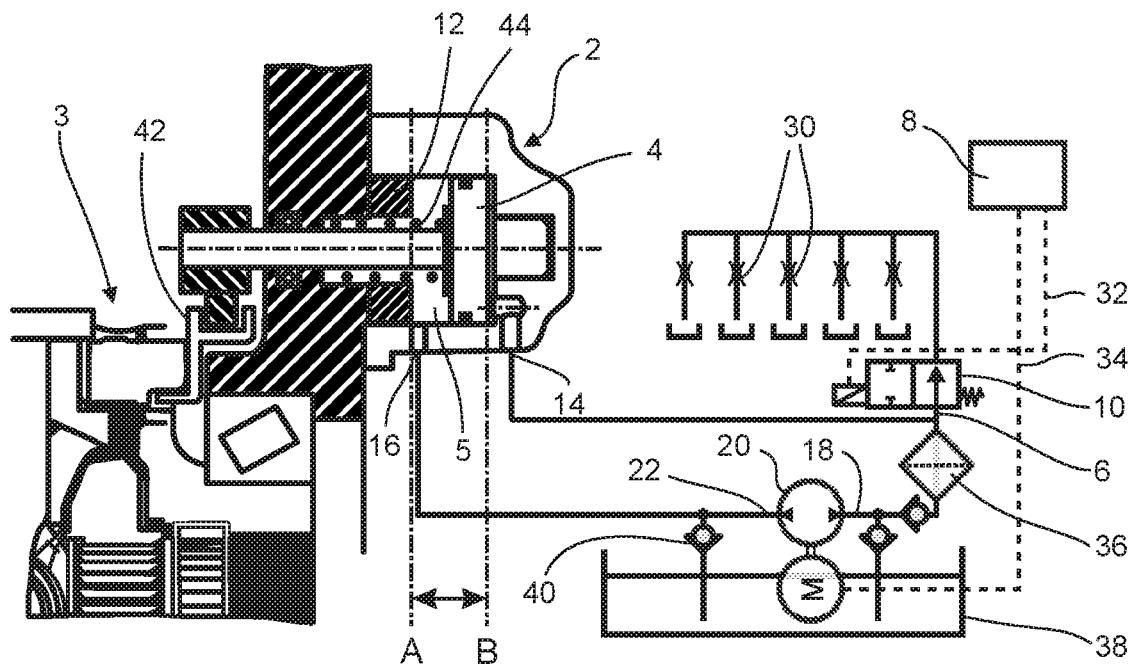
FIG. 1 illustrates a first example of an actuation and lubricant supply system.

FIG. 1 shows a hydraulic actuation and lubricant supply system with an actuator 2 as disclosed herein. The system is designed for the switch position-dependent lubrication and/or cooling of drive train elements of a motor vehicle and comprises a piston-cylinder unit which can be actuated via a hydraulic pressure supply and consists of a pressure cylinder 5 and a working piston 4. In this case, this piston-cylinder unit has no valve function; the cooling/lubrication of the marked consumer 30 takes place exclusively via the valve function.

The pressure supply here is formed by a supply system for hydraulic oil as hydraulic fluid, including a sump 38 as an oil reservoir, through which hydraulic fluid, filtered by a pump 20 via an oil filter 36, is supplied to the first pressure inlet 14. The control unit 8 is connected to receive sensor information from the pressure supply via a pump control line 34. The valve 10 in turn is connected to the control unit 8 via a valve control line 32. The second pressure inlet is connected to the pump 20 via a second pump connection, whereby the second pump connection 22 is flow-connected to the oil sump 38 via a non-return valve 40 in such a way that hydraulic fluid can be sucked from the oil sump 38 via the second pump connection 22, but backflow is prevented via the non-return valve 40.

The working piston 4 is connected via a power transmission element with a functional part 3 of a motor vehicle to be actuated. This can be the shift fork 42 shown here or a part of a clutch, a parking brake or any other part of the vehicle.

Between the consumer 30 and the pressure supply device an electrically actuated valve 10 is provided which can be controlled by a control unit 8. A control of the valve 10 via the control unit 8 is set up in such a way that, when the valve 10 is closed, the pressure supply unit can generate a switching pressure in the piston-cylinder unit to move the working piston 4 to a first extreme position A and the hydraulic fluid outlet 6 is released by opening the valve 10 as soon as the working piston 4 has moved to the first extreme position A. In contrast, when valve 10, e.g., a proportional valve, is open, the hydraulic fluid in consumer 30 is supplied.

In the configuration of actuator 2 shown in FIG. 1, the working piston 4 is pressurized on both sides. On the piston-cylinder unit, a first pressure inlet 14 is provided for moving the working piston 4, which is in extreme position B in the illustration, to the first extreme position A (switching position—marked with the dotted line as the front face of the working piston 4). A second pressure inlet 16 is provided for moving working piston 4 to the opposite second extreme position B, the first pressure inlet 14 being connected to a first pump connection 18 of the pressure supply device designed as a bidirectional pump 20 and the second pressure inlet 16 being connected to a second pump connection 22 of pump 20.

The actuator 2 has bi-directional stability as shown in FIG. 1. For this purpose, a permanent magnet 12 is provided in the pressure cylinder 5 as a holding means which holds the working piston 4 in place when the extreme position A is reached. A resetting means 44 pushes the working piston 4 in the opposite direction, towards the extreme position B. If a hydraulic pressure is now applied via the second pressure inlet 16, it is distributed in the left part of the pressure cylinder 5, which here forms a left, first working chamber. To prevent the second pressure inlet 16 from being blocked by the working piston 4, the working piston 4 has a protruding area on the left side in the inner area in the direction of the permanent magnet 12, which creates a radial gap between the permanent magnet 12 and the working piston 4 outside of this elevation even if the working piston 4 abuts the permanent magnet 12 in the extreme position A.

If the hydraulic pressure at the second pressure connection 16 is increased, resulting in a higher hydraulic force compared to the force of the permanent magnet 12, the connection between working piston 4 and permanent magnet 12 is released. The working piston 4 is then moved to the right into the extreme position B by means of the hydraulic pressure, whereby the return spring acts as a restoring medium 44. At the same time, the resetting means 44 ensures that even in extreme position B a defined contact of the working piston 4 to the right edge of the pressure cylinder 5 is guaranteed. To reset the working piston 4, a hydraulic pressure can be applied to a first pressure connection 14 which, against the force of the resetting agent 44, forces the working piston 4 back towards the extreme position A and the permanent magnet 12.

The permanent magnet 12 and the resetting means 44 ensure that the working piston 4 is always in a defined position, even if no hydraulic pressure is provided. Either the holding force of the permanent magnet 12 is strong enough to keep working piston 4 in contact with the left extreme position A or the resetting means 44 forces working piston 4 to the right into extreme position B. This prevents the working piston 4 from remaining in a central position.

Figure 2:
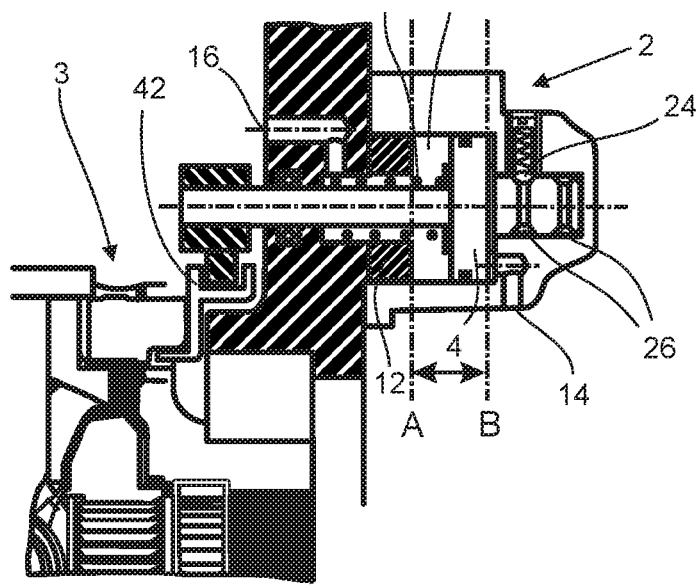
FIG. 2 illustrates the actuator of a further example of an actuating and lubricant supply system.

FIG. 2 shows a similar actuator 2, but with a working piston 4 which has an extension on the right-hand side that dips into a cylindrical bore in the housing of the pressure cylinder 5 and is guided in this bore. This extension has two ring-shaped grooves as detent edges 26, by means of which a locking device can fix the working piston 4. In this case, the locking device is, for example, a detent ball 24, which is mounted in a channel running radially towards the extension and is set by a spring on the groove, the rear edge of which forms the detent edge 26. This locking device holds the working piston 4 in the deflected position, the extreme position B.

To the right of the groove described above, another groove is shown which ensures that working piston 4 can also be held in the opposite extreme position A by the locking device 12. Instead of the shown spring-loaded bearing of a locking element (detent ball 26), a sensor-controlled, electric motor-operated locking device can also be used. The second pressure inlet 16 is provided here in the front area of the pressure cylinder 5. This embodiment of the actuator 2 also has a resetting means 44 in the form of a spring. In addition, an electromagnet 12 is also provided here, which holds the working piston 4 in the front extreme position A. The receiving bore for the resetting means 44, through which the piston rod of working piston 4 also extends concentrically, also serves as a supply channel for the working pressure provided via the second pressure inlet 16.

Figure 3A:
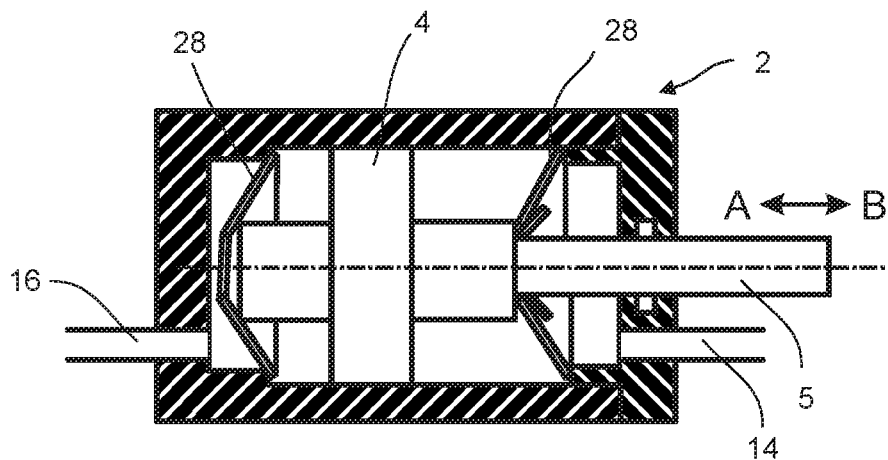
FIG. 3a illustrates a pressure cylinder with working piston of a third example of the actuator.

FIG. 3a shows a different example of the retaining means. Here, the retaining means are formed by diaphragm springs 28, which are dimensioned and mounted inside the pressure cylinder 5 so that they can assume 2 stable positions. In the position shown, the working piston 4 is in the left extreme position A. If hydraulic pressure is now applied via the second pressure inlet 16, this is first applied to the circulating diaphragm spring 28 and thus presses the piston rod projecting forward from working piston 4 together with working piston 4 and the right-hand diaphragm spring 28 to the right until the working piston 4 reaches the right extreme position B. During the movement, the diaphragm springs 28 fold over so that their outer spring areas, set at an angle to the direction of displacement of working piston 4, turn over in the opposite direction to the alignment shown. These diaphragm springs 28 thus have two stable states and a bistable deformation range arranged in between. This is used here to construct the bistable actuator 2.

Figure 3B:
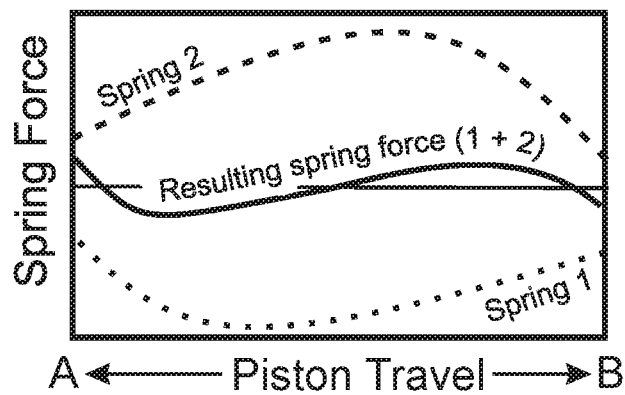
FIG. 3b illustrates the force profile of the forces exerted on the working piston by the retaining means of the actuator shown in FIG. 3A.

FIG. 3b shows the force conditions during the movement of the working piston 4 shown in FIG. 3a. It can be seen that at the beginning of the movement, spring forces are generated which oppose the movement of the working piston 4. This means that the diaphragm springs 28 press the working piston 4 into the extreme positions A and B. The unstable range in between is automatically taken up after the initial stable range has been overcome by the hydraulic pressure force of the system.

Figure 4:
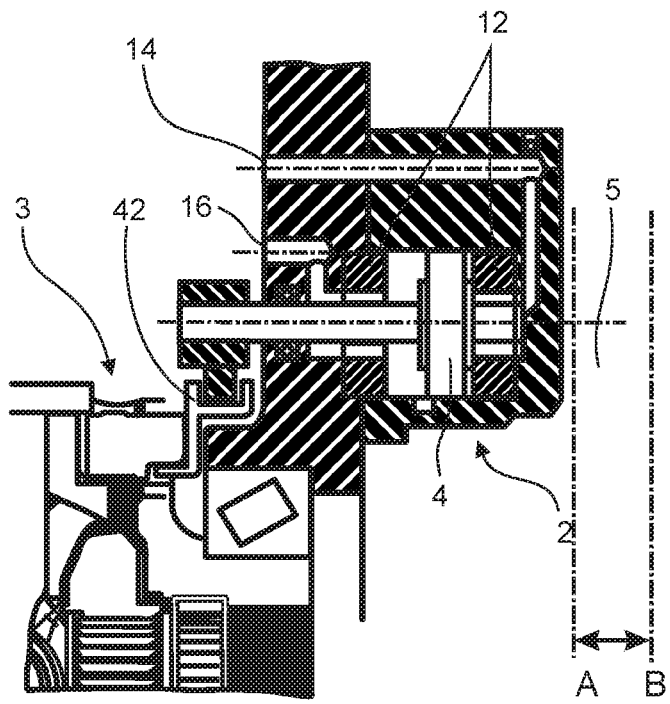
FIG. 4 illustrates a further example of a possible actuator.

FIG. 4 shows a further example of an actuator 2 which has two opposing permanent magnets 12, whereby the hydraulic pressure is introduced into the pressure cylinder 5 via the first pressure inlet 14 and the second pressure inlet 16. Both pressure inlets, the first pressure inlet 14, and the second pressure inlet 16, are located in the front area of the actuator 2 and conduct the hydraulic pressure via a line system to the front and rear surface of the piston, whereby the permanent magnets have an annular gap between the piston rod on the left side and an extension of the working piston 4 on the right side, through which the pressure can be directed to the respective surface of the working piston 4.

Figure 5:
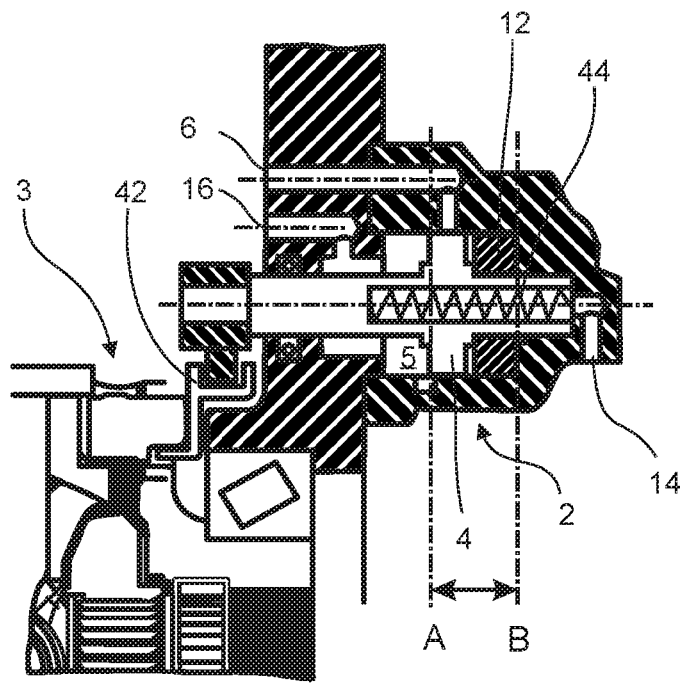
FIG. 5 illustrates a fifth example of an actuator.

FIG. 5 shows an example of the actuator 2 which has a coil spring integrated into the axis of working piston 4 as resetting means 44. At the same time, hydraulic pressure is also applied to the receiving chamber for the resetting agent 14 via the first pressure inlet 14. In the right-hand area of the pressure cylinder 5 there is a permanent magnet 12 as a holding device. In this example, the hydraulic pressure applied via the first pressure inlet 14 shifts working piston 4 to the left to the extreme position A. This tensions the coil spring so that when the hydraulic pressure is released, working piston 4 is automatically pulled back towards permanent magnet 12 via resetting means 44 until the magnetic force of permanent magnet 12 is sufficient to hold working piston 4 in place. This example also has a first pressure inlet 14 and a second pressure inlet 16 so that the working piston 4 can be moved back and forth by alternately applying hydraulic pressure to the first pressure inlet 14 and the second pressure inlet 16.

In the shown example of the actuator 2 according to FIG. 5, a hydraulic fluid outlet 6 is provided in the upper area of the housing of the pressure cylinder 5, which leads into the pressure cylinder 5 in the middle area. This means that in the two extreme positions A and B there is a flow connection between the first pressure inlet 14 and the second pressure inlet 16 with the hydraulic fluid outlet 6. This is done, as described above, for cooling or lubricant supply of further components and can basically be used with any of the designs shown here.

The shape and position of the hydraulic fluid outlet 6 should only be understood as an example of the basic function. In addition, the hydraulic fluid outlet 6 can of course also be positioned in such a way that it only comes into flow connection with one of the working spaces, in front of or behind the working piston 4, so that, for example, hydraulic fluid outlet 6 remains closed in one of the two extreme positions A or B. Ultimately this depends on the desired application. However, since the most continuous possible supply of lubricant or coolant is usually desired, the position of hydraulic fluid outlet 6 shown in FIG. 5 will often be preferred.

Figure 6:
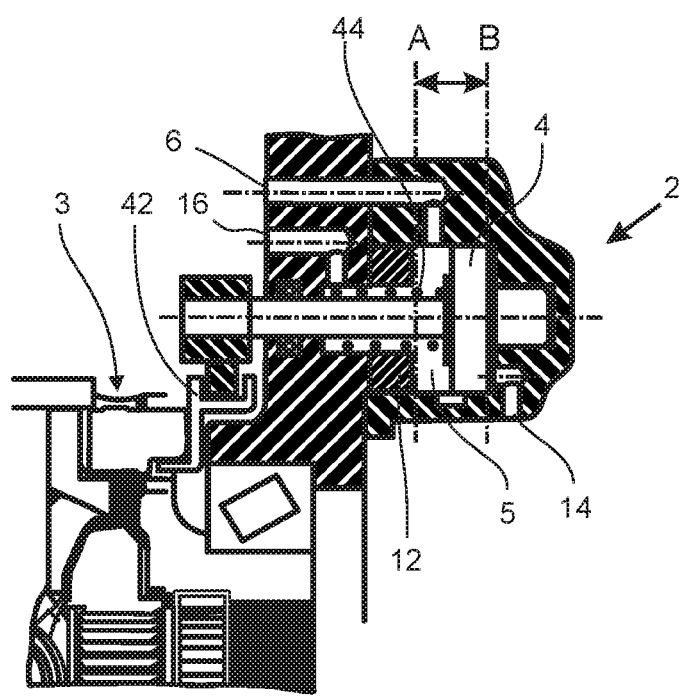
FIG. 6 illustrates the actuator as shown in FIG. 1 with an additional hydraulic fluid outlet.

Finally, FIG. 6 shows a variant of Actuator 2 that is very similar to the design shown in FIG. 1. Here, too, a first pressure inlet 14 is provided in the front area, which introduces hydraulic pressure into the pressure cylinder 5. In contrast to FIG. 1, however, this actuator 2, like the actuator 2 shown in FIG. 5, is also provided with a hydraulic fluid outlet 6 which, in the middle position of the working piston 4, is in flow connection with one of the two pressure inlets, the first pressure inlet 14 or the second pressure inlet 16, so that the hydraulic fluid can flow through the pressure cylinder 5.

Moreover, this actuator 2 is also equipped with a resetting means 44 in the form of a spring, which pushes the working piston 4 to the right position, the extreme position B.

Of course, variants of actuator 2 can also be equipped with a tension spring as resetting means 44 instead of a compression spring. Furthermore, the magnets can be arranged in a fixed position in the pressure cylinder 5, but it is also possible to equip the working piston 4 with the magnet. A combination is also possible, so that magnets are provided in or on the pressure cylinder 5 as well as on the working piston 4.

TABLE OF REFERENCE NUMBERS

2 Actuator
3 Functional part
4 Working piston
5 Pressure cylinder
6 Hydraulic fluid outlet
8 Control unit
10 Valve
12 Permanent magnet
14 First pressure inlet
16 Second pressure inlet
18 First pump connection
20 Pump
22 Second pump connection
24 Locking ball
26 Snap-in edge
28 Diaphragm spring
30 Consumers
32 Valve control line
34 Pump control line
36 Oil filter
38 Oil sump
40 Check valve
42 Shift fork
44 Resetting means

The invention claimed is:

1. An actuator for hydraulically actuating a functional part of a motor vehicle, comprising:
   a working piston that is movable in a pressure cylinder of a piston-cylinder unit, which can be acted upon by a hydraulic pressure of a pressure supply and can be moved reciprocally within the pressure cylinder between a first extreme position and a second extreme position; and
   a resetting means for exerting a resetting force on the working piston in the opposite direction to the first one and permanently urges it towards one of the extreme positions, when the resetting force is greater than the hydraulic force;
   wherein two chambers separated from each other by the working piston are provided in the pressure cylinder and a first chamber is formed as a first working chamber with a first pressure inlet,
   wherein a hydraulic pressure applied to the first pressure inlet urges the working piston in a first direction towards the first extreme position in order to enlarge the first working chamber, and
   wherein, for forming an at least unistable working piston, which is automatically attracted in one of the extreme positions when approaching the one of the extreme positions and is held there until a sufficient release force occurs, at least one holding means is provided in the pressure cylinder for automatically fixing the working piston in the one of the extreme positions when reaching this extreme position even without hydraulic pressure being applied.

2. The actuator of claim 1, wherein the at least one holding means includes two holding means provided for forming a bistable working piston which is attracted in both extreme positions and is held there until a release force occurs, the two holding means being provided such that in both extreme positions the working piston is automatically fixed by one of the holding means when the respective extreme position is reached.

3. The actuator of claim 2, wherein the holding means are provided such that they are capable of exerting a permanent attractive force on the working piston, the attractive force decreasing as the distance of the working piston from the holding means increases and the attractive force of each holding means being dimensioned such that, after the working piston has passed the middle position, the holding means towards which the working piston moves exerts a greater attraction than the holding means from which the working piston moves away.

4. The actuator of claim 1, wherein the holding means is established by the resetting means.

5. The actuator of claim 1, wherein the resetting means is a spring.

6. The actuator of claim 1, wherein at least at one of the extreme positions a magnet is arranged in the pressure cylinder for holding the piston.

7. The actuator of claim 1, wherein the holding means, at at least one of the extreme positions, includes a latching or snap-in connection, the working piston having a first latching edge which, when the extreme position is reached, resiliently engages behind a fixed or resiliently mounted second latching edge of the pressure cylinder, which second latching edge is provided in a fixed position relative to the pressure cylinder.

8. The actuator of claim 1, wherein, at at least one of the extreme positions, a beveled diaphragm spring is provided as a jump-over spring, which is fastened by a central region to a piston rod or another attachment part of the working piston, wherein the diaphragm spring extends outwardly at an angle to the piston axis of the working piston and is capable of changing between two orientations, and the diaphragm spring and the pressure cylinder are dimensioned such that the diaphragm spring projects outwards in a first stable orientation when the first extreme position is reached and changes over into a second orientation when the opposite extreme position is reached.

9. The actuator of claim 1, wherein a space provided on the side of the working piston opposite a first working space is a second working space with a second pressure inlet.

10. The actuator of claim 1, wherein the pressure cylinder has a hydraulic fluid outlet which can be opened and closed by the movement of the working piston for lubrication or cooling depending on the switching position, above which, in a defined position of the working piston or during a defined range of movement of the working piston in the pressure cylinder, is a flow connection with the first pressure inlet or the second pressure inlet, so that fed hydraulic fluid can be fed to a hydraulic fluid outlet for onward transmission for cooling or lubricating a consumer.

11. The actuator of claim 10, wherein the defined position of the working piston, in which the hydraulic fluid outlet is opened, is one of the extreme positions or both extreme positions or a position of the working piston between the extreme positions.

12. The actuator of claim 10, wherein the defined range of movement of the working piston, in which the hydraulic fluid outlet is opened, is a travel distance which lies between the extreme positions, preferably a central region of the pressure cylinder.

13. A hydraulic actuating and lubricant supply system for a motor vehicle for the combined, mechanical actuation of a functional part of the motor vehicle by driving movement of a power transmission element connected directly or indirectly to the functional part and driven by the working piston, and for conveying coolants and/or lubricants for lubricating or cooling components of the motor vehicle, comprising:

an actuator for hydraulically actuating a functional part of a motor vehicle that includes a working piston that is movable in a pressure cylinder of a piston-cylinder unit, which can be acted upon by a hydraulic pressure of a pressure supply and can be moved reciprocally within the pressure cylinder between a first extreme position and a second extreme position; wherein a resetting means is provided for exerting a resetting force on the working piston in the opposite direction to the first one and permanently urges it towards one of the extreme positions, when the resetting force is greater than the hydraulic force; wherein two chambers separated from each other by the working piston are provided in the pressure cylinder and a first chamber is formed as a first working chamber with a first pressure inlet, wherein a hydraulic pressure applied to the first pressure inlet urges the working piston in a first direction towards the first extreme position in order to enlarge the first working chamber, and wherein, for forming an at least unstable working piston, which is automatically attracted in one of the extreme positions when approaching the one of the extreme positions and is held there until a sufficient release force occurs, at least one holding means is provided in the pressure cylinder for automatically fixing the working piston in the one of the extreme positions when reaching this extreme position even without hydraulic pressure being applied; and a valve, actuatable by a control unit and between the hydraulic fluid outlet and the pressure supply, wherein the valve is controllable such that a switching pressure can be generated in the pressure cylinder by the pressure supply when the valve is closed in order to transfer the working piston into a first position, and the hydraulic fluid outlet is released by opening the valve as soon as the working piston is transferred into the first position.

14. The hydraulic actuating and lubricant supply system for a motor vehicle of claim 13, wherein the working piston is arranged so that it can be pressurized on both sides, and on the pressure cylinder the first pressure inlet for moving the working piston into the first extreme position and a second pressure inlet for moving the working piston into the opposite second extreme position are provided, wherein the first pressure inlet is connected to a first connection of a bidirectional pump and the second pressure inlet is connected to a second connection of the bidirectional pump.

* * * * *